(12) United States Patent
Watterson

(10) Patent No.: US 9,878,210 B2
(45) Date of Patent: Jan. 30, 2018

(54) HUMAN POWERED VEHICLE WITH AN ADJUSTMENT ASSEMBLY

(71) Applicant: ICON Health & Fitness, Inc., Logan, UT (US)

(72) Inventor: Scott R. Watterson, Logan, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 134 days.

(21) Appl. No.: 14/952,038

(22) Filed: Nov. 25, 2015

(65) Prior Publication Data

US 2016/0144240 A1    May 26, 2016

Related U.S. Application Data

(60) Provisional application No. 62/085,198, filed on Nov. 26, 2014.

(51) Int. Cl.
| | |
|---|---|
| *A63B 24/00* | (2006.01) |
| *B62K 3/00* | (2006.01) |
| *B62M 1/36* | (2013.01) |
| *A63B 21/22* | (2006.01) |
| *A63B 22/06* | (2006.01) |
| *B62J 99/00* | (2009.01) |

(52) U.S. Cl.
CPC .......... *A63B 24/0087* (2013.01); *A63B 21/22* (2013.01); *A63B 22/0605* (2013.01); *B62J 99/00* (2013.01); *B62K 3/00* (2013.01); *B62M 1/36* (2013.01); *A63B 2024/0093* (2013.01); *B62J 2099/0013* (2013.01); *B62J 2300/0013* (2013.01)

(58) Field of Classification Search
CPC ............ A63B 24/0075; A63B 22/0058; A63B 24/0087; A63B 21/22; A63B 22/0605; A63B 2024/009; A63B 24/00; A61B 5/1038; B62K 3/00; B62M 1/36; B62J 2099/0013; B62J 99/00; B62J 2300/00133
See application file for complete search history.

(56) References Cited

U.S. PATENT DOCUMENTS

| 3,394,934 A | 7/1968 | Petros et al. |
| 5,938,571 A | 8/1999 | Stevens |

(Continued)

FOREIGN PATENT DOCUMENTS

| EP | 1473219 | 11/2004 |
| EP | 2338782 | 6/2011 |

(Continued)

OTHER PUBLICATIONS

European Patent Application No. 15196354.3; European Search Report; dated Apr. 8, 2016; 9 pgs.

*Primary Examiner* — Glenn Richman
(74) *Attorney, Agent, or Firm* — Holland & Hart LLP

(57) ABSTRACT

A human powered vehicle includes a frame, a crank assembly disposed on the frame, a wheel rotatably attached to the frame, and a force rotation adjustment assembly in communication with the wheel. The human powered vehicle also includes a processor and memory, where the memory has programmed instructions executable by the processor to determine a calorie goal of the user, determine a user history, and adjust an force applied by the adjustment assembly based at least in part on the calorie goal.

20 Claims, 4 Drawing Sheets

(56) References Cited

U.S. PATENT DOCUMENTS

| | | |
|---|---|---|
| 6,446,745 B1 | 9/2002 | Lee et al. |
| 6,749,546 B2 | 6/2004 | Yang |
| 7,980,996 B2 | 7/2011 | Hickman |
| 8,128,533 B2 * | 3/2012 | Nakagawa .......... A63B 22/0058 434/247 |
| 2007/0142175 A1 | 6/2007 | Morgan et al. |
| 2009/0181826 A1 | 7/2009 | Turner et al. |
| 2011/0009240 A1 * | 1/2011 | Chiu .................. A63B 24/0075 482/5 |
| 2014/0194260 A1 | 7/2014 | Campanaro et al. |
| 2015/0141202 A1 * | 5/2015 | Ellis .................... A61B 5/1038 482/8 |
| 2016/0136483 A1 * | 5/2016 | Reich ................ A63B 24/0062 482/2 |

FOREIGN PATENT DOCUMENTS

| | | |
|---|---|---|
| EP | 2352667 A1 | 8/2011 |
| EP | 2657865 | 10/2013 |
| GB | 2327621 | 2/1999 |
| JP | 2002234479 | 8/2002 |
| JP | 2003180899 | 7/2003 |
| WO | 2015154046 | 10/2015 |

\* cited by examiner

|  | Calories Consumed | Calories Burned | Maintenance Calories | Calorie Goal | Reward | Penalty |
|---|---|---|---|---|---|---|
| Sunday | 1900 | 200 | 1800 | -500 |  | 400 |
| Monday | 1750 | 550 | 1800 | -500 |  | 0 |
| Tuesday | 1800 | 100 | 1800 | -500 |  | 400 |
| Wednesday | 1850 | 350 | 1800 | -500 |  | 200 |
| Thursday | 2000 | 400 | 1800 | -500 |  | 300 |
| Friday |  |  |  | -500 |  |  |
| Saturday |  |  |  | -500 |  |  |
| Total |  |  |  | -3500 |  | 1300 |

*FIG. 3*

HUMAN POWERED VEHICLE WITH AN ADJUSTMENT ASSEMBLY

RELATED APPLICATIONS

This application claims priority to U.S. Patent Application Ser. No. 62/085,198 titled "Human Powered Vehicle with an Adjustment Assembly" and filed on 26 Nov. 2014, which application is herein incorporated by reference for all that it discloses.

BACKGROUND

Riding bicycles is a popular way to get exercise. Bicycles are typically human powered and have two wheels connected by a frame. The rear wheel is typically geared to a crank shaft with pedals. To propel the bicycle, the user can rotate the pedals of the crank shaft with his or her feet.

Some bicycles incorporate a motor that is arranged on the bicycle to rotate the wheels. Often, such a motor is intended to assist the user in propelling the bicycle. In other words, the user may still pedal with such a bicycle, but the motor can make the pedaling easier. In some situations, the user can stop pedaling altogether and rely solely on the motor to propel the bicycle forward.

One type of electric powered vehicle is disclosed in U.S. Pat. No. 6,446,745 issued to Michael John Lee, et al. In this reference, a control system for an electric powered vehicle provides substantially greater control and related features than the simple control systems known in the art. The control system can be utilized with any type of electric powered vehicle, such as bicycles, scooters, tricycles, four-wheeled vehicles and the like. In a first embodiment of the invention, the control system estimates an amount of heat generated in the vehicle electric motor and assigns heat credits based on the relationship between the estimated motor heat and a predetermined heat level. The operation of the motor is then controlled in accordance with the available heat credits so as to prevent overheating of the motor. In a second embodiment of the invention, the control system monitors the current state of charge of the battery and presents that information to the rider. Since the battery voltage is affected by the load on the battery mostly due to the motor, the motor is periodically disconnected from the battery so that an unloaded battery voltage measurement can be made. In a third embodiment of the invention, the control system monitors the current operational state of the motor to detect a failure mode in which the full battery voltage is applied to the motor, potentially causing it to run away at full torque and full speed. When a failure mode is detected, the control system first attempts to shut off control signals to the motor. If this fails to stop the failure mode condition, the control system disconnects the battery from the motor by opening a fuse. In a fourth embodiment of the invention, the control system includes a cruise control feature that allows the electric powered vehicle to operate at a desired speed set by the rider. In a fifth embodiment of the invention, the control system controls operation of vehicle lights to accommodate variations in battery voltage. In a sixth embodiment of the invention, the control system controls operation of a horn so that it can also function to provide audible signals reflection operational conditions of the vehicle. In a seventh embodiment of the invention, the control system allows the vehicle to operate in a biofeedback mode to serve as an exercise or training device for the rider. Another type of systems is described in U.S. Patent Publication No. 2009/0181826 issued to James R. Turner, et al and European Patent Application No. EP2657865A1 issued to Iwan Van Hende. All of these documents are herein incorporated by reference for all that they contain.

SUMMARY

In one aspect of the invention, a human powered vehicle includes a frame.

In one aspect of the invention, the human power vehicle has a crank assembly disposed on the frame.

In one aspect of the invention, the human powered vehicle has a wheel rotatably attached to the frame.

In one aspect of the invention, the human powered vehicle includes a rotation force adjustment assembly disposed on the frame in communication with the wheel.

In one aspect of the invention, the human powered vehicle includes a processor and memory.

In one aspect of the invention, the memory comprises programmed instructions executable by the processor to determine a calorie goal of the user.

In one aspect of the invention, the programmed instructions are further executable by the processor to determine a user history.

In one aspect of the invention, the programmed instructions are further executable by the processor to adjust an force applied by the adjustment assembly based at least in part on the calorie goal.

In one aspect of the invention, the programmed instructions are further executable by the processor to determine a route to be taken by a user.

In one aspect of the invention, the programmed instructions are further executable by the processor to determine where along the route to adjust the force applied by the adjustment assembly.

In one aspect of the invention, the user history comprises a calorie history.

In one aspect of the invention, the user history comprises an exercise history.

In one aspect of the invention, the adjustment mechanism comprises an assistance mechanism arranged to contribute to the rotation of the wheel.

In one aspect of the invention, the assistance mechanism is arranged to contribute to the rotation of the wheel when a user earns a reward by being ahead of the calorie goal.

In one aspect of the invention, the adjustment mechanism comprises a resistance mechanism arranged to resist the rotation of the wheel.

In one aspect of the invention, the resistance mechanism is arranged to resist the rotation of the wheel when a user receives a penalty by being behind of the calorie goal.

In one aspect of the invention, the adjustment mechanism is in communication with a remote computing device.

In one aspect of the invention, the human powered vehicle further comprises a sensor that determines whether the assistance mechanism applies the force.

In one aspect of the invention, the sensor is a thermal sensor arranged to determine when a temperature threshold of the assistance mechanism is reached.

In one aspect of the invention, a human powered vehicle includes a frame.

In one aspect of the invention, the human power vehicle has a crank assembly disposed on the frame.

In one aspect of the invention, the human powered vehicle has a wheel rotatably attached to the frame.

In one aspect of the invention, the human powered vehicle includes a rotation force adjustment assembly disposed on the frame in communication with the wheel.

In one aspect of the invention, the human powered vehicle includes a processor and memory.

In one aspect of the invention, the memory comprises programmed instructions executable by the processor to determine a calorie goal of the user.

In one aspect of the invention, the memory comprises programmed instructions executable by the processor to determine a user history.

In one aspect of the invention, the memory comprises programmed instructions executable by the processor to adjust an force applied by the adjustment assembly based at least in part on the calorie goal.

In one aspect of the invention, the adjustment mechanism comprises an assistance mechanism arranged to contribute to the rotation of the wheel.

In one aspect of the invention, the assistance mechanism is arranged to contribute to the rotation of the wheel when a user earns a reward by being ahead of the calorie goal.

In one aspect of the invention, the programmed instructions are further executable by the processor to postpone assistance from the assistance mechanism to build up a larger reward.

In one aspect of the invention, the programmed instructions are further executable by the processor to determine a route to be taken by a user.

In one aspect of the invention, the programmed instructions are further executable by the processor to determine where along the route to adjust the force applied by the adjustment assembly.

In one aspect of the invention, the user history comprises a calorie history.

In one aspect of the invention, the user history comprises an exercise history.

In one aspect of the invention, the adjustment mechanism comprises a resistance mechanism arranged to resist the rotation of the wheel.

In one aspect of the invention, a human powered vehicle includes a frame.

In one aspect of the invention, the human power vehicle has a crank assembly disposed on the frame.

In one aspect of the invention, the human powered vehicle has a wheel rotatably attached to the frame.

In one aspect of the invention, the human powered vehicle includes a rotation force adjustment assembly disposed on the frame in communication with the wheel.

In one aspect of the invention, the human powered vehicle includes a processor and memory.

In one aspect of the invention, the memory comprises programmed instructions executable by the processor to determine a calorie goal of the user.

In one aspect of the invention, the memory comprises programmed instructions executable by the processor to determine a user history where the user history comprises a calorie history and an exercise history.

In one aspect of the invention, the memory comprises programmed instructions executable by the processor to determine a route to be taken by a user.

In one aspect of the invention, the memory comprises programmed instructions executable by the processor to adjust an force applied by the adjustment assembly based at least in part on the calorie goal.

In one aspect of the invention, the memory comprises programmed instructions executable by the processor to determine where along the route to adjust the force applied by the adjustment assembly.

In one aspect of the invention, the adjustment mechanism comprises an assistance mechanism arranged to contribute to the rotation of the wheel and a resistance mechanism arranged to resist the rotation of the wheel.

In one aspect of the invention, the assistance mechanism is arranged to contribute to the rotation of the wheel when a user earns a reward by being ahead of the calorie goal.

In one aspect of the invention, the resistance mechanism is arranged to resist the rotation of the wheel when a user receives a penalty by being behind of the calorie goal.

In one aspect of the invention, the adjustment mechanism is in communication with a remote computing device.

In one aspect of the invention, the human powered vehicle includes a sensor that determines whether the assistance mechanism applies the force.

In one aspect of the invention, the sensor is a thermal sensor arranged to determine when a temperature threshold of the assistance mechanism is reached.

Any of the aspects of the invention detailed above may be combined with any other aspect of the invention detailed herein.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

FIG. 3 illustrates a block diagram of an example of a user history in accordance with the present disclosure.

Throughout the drawings, identical reference numbers designate similar, but not necessarily identical, elements.

DETAILED DESCRIPTION

Figure 1:
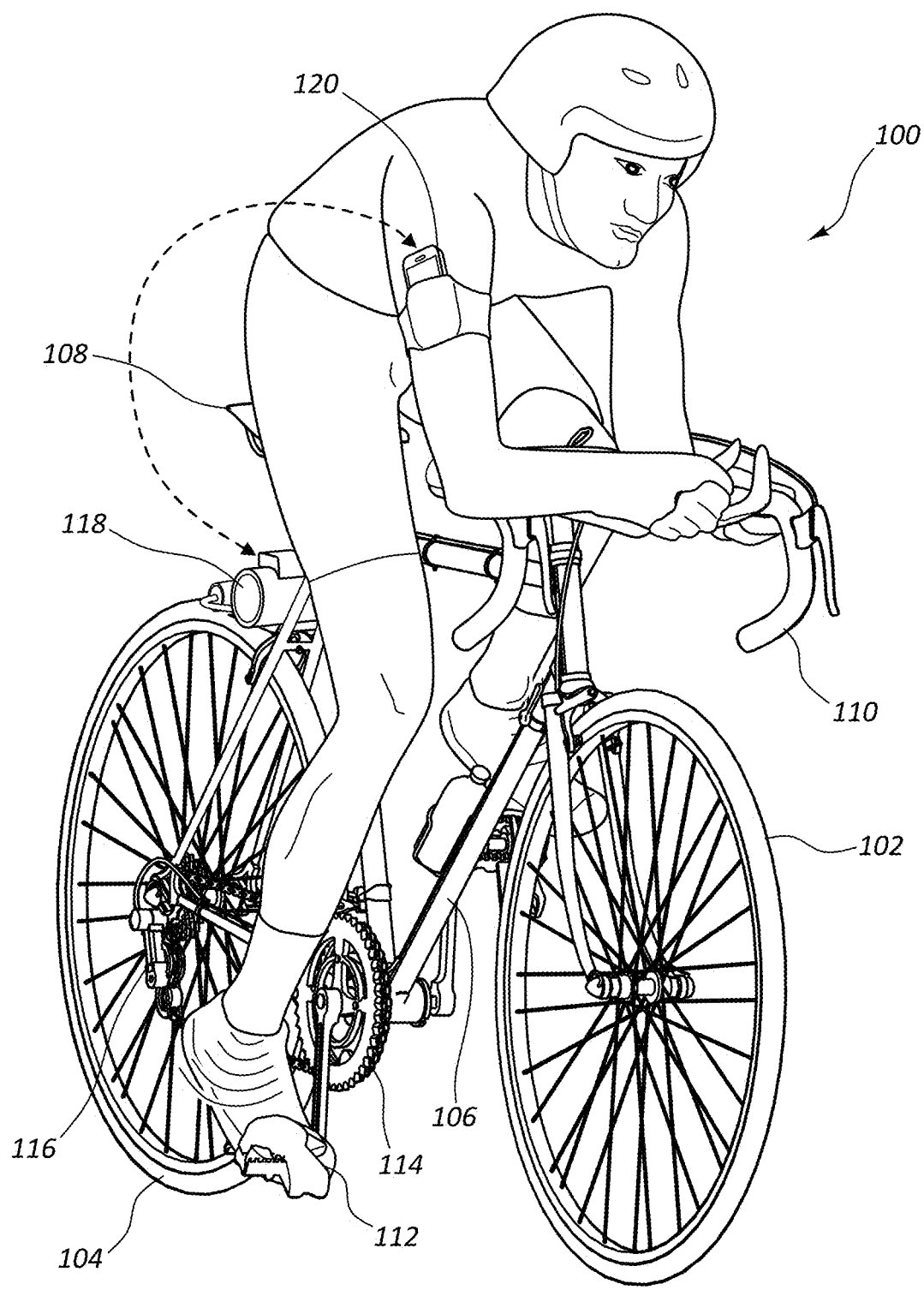
FIG. 1 illustrates a perspective view of an example of a human powered vehicle in accordance with the present disclosure.

Particularly, with reference to the figures, FIG. 1 illustrates a perspective view of an example of a human powered vehicle 100 in accordance with the present disclosure. In this example, the human powered vehicle 100 is a bicycle with a front wheel 102 and a rear wheel 104 connected by a frame 106. The frame 106 also include a seat 108 and handle bars 110 that allow the user to sit and steer the bicycle, respectively. The bicycle can be propelled by the user by turning a crank assembly 112 with his or her feet. A chain 114 connects the crank assembly 112 to a gear 116 connected to the rear wheel 104.

In the illustrated example, the bicycle includes an adjustment assembly that can vary the difficulty of propelling the bicycle forward. Such an adjustment assembly may include an assistance mechanism and/or a resistance mechanism. In this example, the bicycle also includes an assistance mechanism that has a motor 118 that is connected to the rear wheel 104. The motor 118 is arranged such that as the motor 118 rotates, the motor assists with the rotation of the rear wheel 104. Thus, the user may cause the motor to rotate to reduce the amount of energy that the user exerts to propel the bicycle forward.

The motor 118 may be in communication with an adjustment system 119 which can adjust the difficulty of propelling the human powered vehicle 100. In some cases, the adjustment system 119 include a mobile device 120 carried by the user or location elsewhere on the bicycle. The mobile device 120 or another device of the adjustment system 119 may send instructions to the motor 118 for when to activate and when to be inactive thus controlling when the user is assisted in propelling the bicycle forward.

The adjustment system 119 may track at least one goal of the user. Such goals may include a net calorie goal over a period of time. The user may input such goals into the mobile device 120 or another device that is part of the adjustment system 119. The net calorie amount may be based on the user's energy expenditure and calorie consumption. The user may input the number of calories consumed by the user during the course of the day or throughout the course of the period of time. In other examples, the adjustment system 119 can figure out the number of calories consumed by the user.

The adjustment system 119 may determine the amount of calories burned by the user. In such examples, the mobile device 120 or a device in communication with the mobile device 120, such as a device affixed to the bicycle, may determine the amount of calories burned by the user. For example, a device on the bicycle may be able to determine the user's speed and distance traveled. Based on such measurements, the adjustment system 119 may determine the number of calories that were expended by the user. In some examples, the adjustment system 119 may have access to profile information about the user, such as the user's weight, body composition, height, stride, age, gender, health conditions, other factors or combinations thereof. Such profile information may be available to the user through an iFit program available through www.ifit.com and administered through ICON Health and Fitness, Inc. located in Logan, Utah, U.S.A. An example of a program that may be compatible with the principles described in this disclosure is described in U.S. Pat. No. 7,980,996 issued to Paul Hickman. U.S. Pat. No. 7,980,996 is herein incorporated by reference for all that it discloses. However, such profile information may be available through other types of programs that contain such information. For example, such information may be gleaned from social media websites, blogs, government databases, private databases, other sources or combinations thereof.

Further, the adjustment system 119 may collect information about the elevation gains and elevation drops along the routes traveled by the user. Such information may also assist the adjustment system 119 in determining the actual amount of calories that the user burns during his or her workout.

In addition to determining the current net calorie status of the user, the adjustment system 119 may be configured to determine how many calories the user will consume based on a workout intended to be accomplished by the user. For example, the adjustment system 119 may recognize that the user intends to ride a specific route home from his or her location of work. The adjustment system 119 may determine the route. Such a route determination may be based on user input, the user's history, other factors or combinations thereof. The route may also be determined from a map. The map may include streets and/or trials that the user can take to get to his or her destination. Such a map may also include elevation changes that can be used to determine the amount of calories that the user will consume along the route.

The adjustment system 119 may chose the route that the user is to take to reach his or her destination. Such a route may include the route options and elevations changes associated with the route options to be traveled by the user. In other examples, the user chooses the route, and the route selection is made known to the adjustment system 119.

The adjustment system 119 may track the user's calorie consumption and energy expenditure. In some examples, the energy expenditure includes just the workouts performed by the user on the bicycle. In other examples, the energy expenditure includes other workouts performed by the user without the bicycle. For example, the calories burned by the user during running workouts, weight lifting workouts, basketball game workouts, other types of workouts or combinations thereof. In yet other examples, all of the user's activities may be included in the calorie burned count. Such a calorie burned count may include the daily activities of the user, such as playing with kids, doing household chores, sleeping, leisure activities and so forth. Also, such a calorie count may also include the calories burned by the user just to maintain the user's bodily functions, such as operating his or her heart, lungs, brain, other organs or combinations thereof.

Based on the user's calorie consumption and energy expenditure, the adjustment system 119 can determine whether the user is on target to meet his or her net calorie goals. If the user is ahead on his or her goals, the adjustment system 119 may determine that the user has earned a reward. In response to determining that the user earned a reward, the adjustment system 119 may determine where or when to apply the reward by assisting the user to propel the bicycle. For example, the adjustment system 119 may determine to apply the reward during the next workout or during a workout on a future date. If the adjustment system 119 determines to apply the reward on the next workout, the adjustment system 119 may determine where along the route to apply the reward. In some cases, the reward may be applied at the steepest elevation gain along the route, the most difficult section of the route, a section of the route with little to no traffic stops or another section of the route.

The adjustment system 119 may follow established policies to determine when and/or where to apply the rewards. In some examples, the user may approve the application of the reward or override the adjustment system 119. In other examples, the user can instruct the adjustment system for when and where the user desires to apply the reward. For example, the user may prefer to continue to accrue reward benefits to apply at a subsequent time or for a particular route. Also, the user may foresee that he or she will be unable to stay on the same pace for meeting his or her net calorie consumption goal later in the time period (i.e. the user's schedule will cause him to miss a workout later in the week or the user plans to attend a party during the week where calorie dense foods are to be served). In such examples, the user may instruct the adjustment system 119 to not apply the reward or to just apply a portion of the reward. In other examples, the user may desire to use the rewards immediately.

In other examples, the adjustment system 119 sends a notification to the user indicating that he or she has earned a reward. In such an example, the user may instruct the adjustment system 119 for when and/or where to apply the reward.

In those situations where the user opts to apply the reward, the adjustment system 119 may apply the reward to a particular location of the route. The adjustment system 119 may include a location identifying mechanism, such as a Global Positioning System (GPS) that recognizes when the user is at the predetermined portion of the route for where the reward is to be applied. In response to determining that the user is located at the predetermined portion of the route, the adjustment system 119 may send instructions to the motor 118 to at least assist the user in propelling the bicycle. In some cases, the motor 118 may just contribute to rotating the rear wheel, while in other examples, the motor 118 is the sole power source for rotating the wheel when the motor 118 is activated.

In some examples, the user's calorie goal is easy enough that the user may use the motor 118 during each ride on the bicycle within the goal's time period. In such situations, the adjustment system 119 may cause the motor 118 to contribute at a predetermined level to propelling the bicycle all of the time. However, the user may still get ahead of schedule for reaching the user's goal, and in such situations, the adjustment system 119 may cause the motor to contribute more than the predetermined level for those times when the rewards are applied.

In some examples, the human powered vehicle 100 may include a resistance mechanism that increases the resistance of propelling the bicycle forward. Any appropriate type of resistance mechanism may be used in accordance with the principles described herein. A non-exhaustive list of resistance mechanisms may include a braking system, a motor configured to apply a force in a backward direction, a gearing mechanism, another type of resistance mechanism or combinations thereof.

The resistance mechanism may be applied in situations where the user is not on target for reaching his or her calorie goal. For example, if it appears that the user is not on pace to reach his calorie goal, the adjustment system 119 may cause the resistance mechanism to increase an amount of resistance to cause the user to burn more calories. In some examples, the adjustment system 119 may cause the resistance to be increased along specific predetermined sections of the route. For example, the adjustment system 119 may determine to increase the resistance of propelling the bicycle forward along a flat section of a route or a downhill portion of the route.

In some cases, the adjustment system 119 may send a notification to the user indicating that the user is accruing a penalty for falling behind on his or her net calorie goal. The adjustment system 119 may make a recommendation for where and/or when to apply the penalty. In response to receiving the recommendation, the user may accept the recommendation or deny the recommendation. In some cases, the user may merely be notified of the penalty, and the user may determine where and/or when to apply it.

The rewards and/or penalties described above may be applied all at once or the rewards and/or penalties may be broken up over the course of the route, over the course of multiple workouts, over the course of multiple days or combinations thereof. In some examples, sensors may be used to determine whether the application of the reward and/or the penalty were actually implemented. The adjustment system 119 may follow at least one predetermined policy for determining whether the reward or penalty was applied. For example, a thermal sensor may be used to determine if the motor is working. In those situations where a command is sent to the motor 118 to apply a reward, but the thermal sensors fails to detect the operation of the motor, the adjustment system 119 may conclude that the reward was never applied. In other situations, the thermal sensor may determine that the motor is too hot to operate. In such a situation, the adjustment system may follow a policy that concludes that the reward and/or penalty was not applied due to overheating. While these examples have been described with specific reference to policies for determining whether a reward or a penalty has been applied, any appropriate policy may be used to determine whether the reward or penalty is applied.

In response to applying the reward and/or penalty, the application of the reward and/or penalty is recorded. Such records may be stored locally on a mobile storage device, on the human powered vehicle 100, a remote device or combinations thereof. In addition, the amount of calories burned by the user may be stored as well in a user history. The user history may be accessed to determine the running net calorie amount and to determine whether to apply a reward, a penalty or no adjustments.

Figure 2:
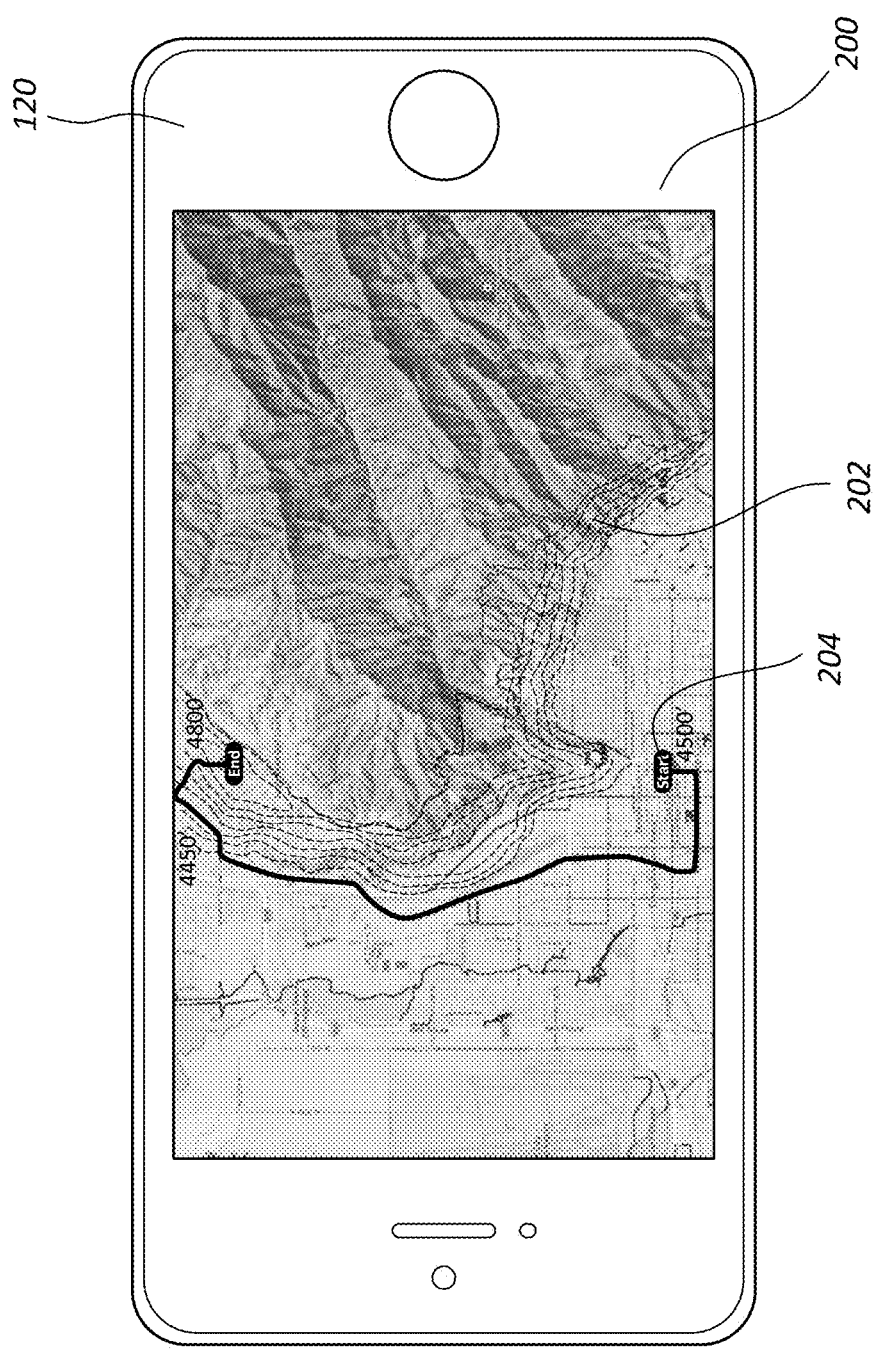
FIG. 2 illustrates a perspective view of an example of a display associated with a human powered vehicle in accordance with the present disclosure.

FIG. 2 illustrates a perspective view of an example of a display 200 associated with a human powered vehicle 100 in accordance with the present disclosure. In the illustrated example, the display 200 is integrated into a mobile device 120. However, the display 200 may be integrated into any appropriate device, such as the human powered vehicle 100, a remote device, a networked device, a watch, a phone, a digital device, an electronic tablet, a laptop, a desktop, another type of device or combinations thereof.

The display 200 depicts a map 202 of the route that the user intends to travel. The map 202 may be accessible over the Internet, a network, a remote storage device, another type of device and/or location or combinations thereof. In some cases, the user may input the route 204 into the map 202. In other examples, the adjustment system 119 determines the route 204 that the user will take based, at least in part, on the characteristics of the user. For example, the adjustment system 119 may consult a user history to determine that the user travels on the bicycle from his or her location of work to his or her home every day at a specific time. In such an example, the adjustment system 119 may automatically determine the route 204 at that specific time each day.

In other examples, the adjustment system 119 uses a GPS device to determine where the user is. In response to determining where the user is, the adjustment system 119 may determine the likely routes that the user will take. For example, if the adjustment system 119 determines that the user is at a trailhead for a popular biking trail, the adjustment system 119 may determine that the popular biking trail is the intended route. In other examples, the adjustment system 119 may operate on an assumption that the biking route 204 will be towards the user's home. In such situations, the adjustment system 119 may determine a route 204 with the user's current location as the starting point and the user's home as the ending point.

In response to the adjustment system 119 determining a route 204, the route 204 may be presented to the user. The user may have the option to accept the route 204 or reject the route 204. While the examples above have been described with specific reference to how the route 204 is determined, any appropriate mechanism for determining the route 204 may be used in accordance with the principles described in the present disclosure.

In some cases after the route 204 is determined, the section of the route 204 where the penalty or the reward is to be applied is selected. The section of the route 204 may be selected based on the difficulty level of that section. For example, the reward may be applied to the difficult sections, while the penalties may be applied to the relatively easier sections of the route. However, the user may desire to have the penalties applied to difficult sections or have the rewards applied to the relatively easier sections. Further, the size of the reward or penalty may be another factor for determining the section of the route. For example, if the penalty or reward is significant, the entire route 204 may be selected as the route 204 section on which the reward or penalty is applied. In one such scenario, the reward or penalty is applied consistently throughout the selected section of the route. While in other examples, the level of difficulty is varied throughout the section depending on user preferences, topology of the section, features of the section, other factors or combinations thereof.

In the illustrated example, the starting elevation of the route 204 is 4,500 feet above sea level. The ending elevation of the route 204 is 4,800 feet above sea level. Thus, the route has a 300 feet elevation gain. The majority of the elevation gain is within the last fifth of the route. In such an example, the adjustment system 119 may determine to apply the reward to the last fifth of the route, or the adjustment system 119 may determine to apply the penalty to somewhere in the first four fifths of the route.

FIG. 3 illustrates a block diagram of an example of a user history 300 in accordance with the present disclosure. In the illustrated example, the user history 300 tracks the number of calories consumed by the user. The user history 300 comprises a plurality of rows that correspond to the days of the week. The last row represents the totals. In this example, the period of time which the user has set a goal is over the course of a week. However, any appropriate period of time may be used in accordance with the principles described in the present disclosure. For example, the prolong time period may include a day, multiple days, a week, multiple weeks, a month, another time period or combinations thereof.

The first column 302 tracks the calories consumed by the user, and the second column 304 tracks the calories burned. The third column 306 tracks maintenance calories which represent the number of calories that the user needs to operate its daily activities without workouts included. This number may be based, at least in part, on the user's age, gender, weight, height, body composition or combinations thereof. The fourth column 308 represents the user's calorie goal, which may be inputted by the user. The fifth column 310 and sixth column 312 represents the rewards and penalties respectfully, which are the difference between the consumed calories and the expended calories (i.e. the calories burned column plus the maintenance column) combined with the calorie goal column.

In the illustrated example, the user has completed the first five days of the period. On Sunday, the user consumed a total of 1,900 calories. The user burned 200 calories during a workout, but also burned an additional 1,800 calories to perform his daily activities. This results in a 100 calorie deficit. However, the user's goal was to have a 500 calorie deficit. Thus, the user has fallen behind on his or her calorie goal on Sunday because the user is short 400 calories. Thus, the user accrued a 400 calorie penalty. On Monday, the user broken even resulting in neither a reward nor a penalty. On Tuesday, Wednesday and Thursday, the user also accrued 400, 200 and 300 more calories penalties. The running total is a 1,300 calorie short fall. Thus, the user has a penalty of 1,300.

The adjustment system 119 may wait until a penalty threshold or a reward threshold is met before implementing the penalty or reward. In some cases, the adjustment system 119 may apply the reward or penalty after each day.

Figure 4:
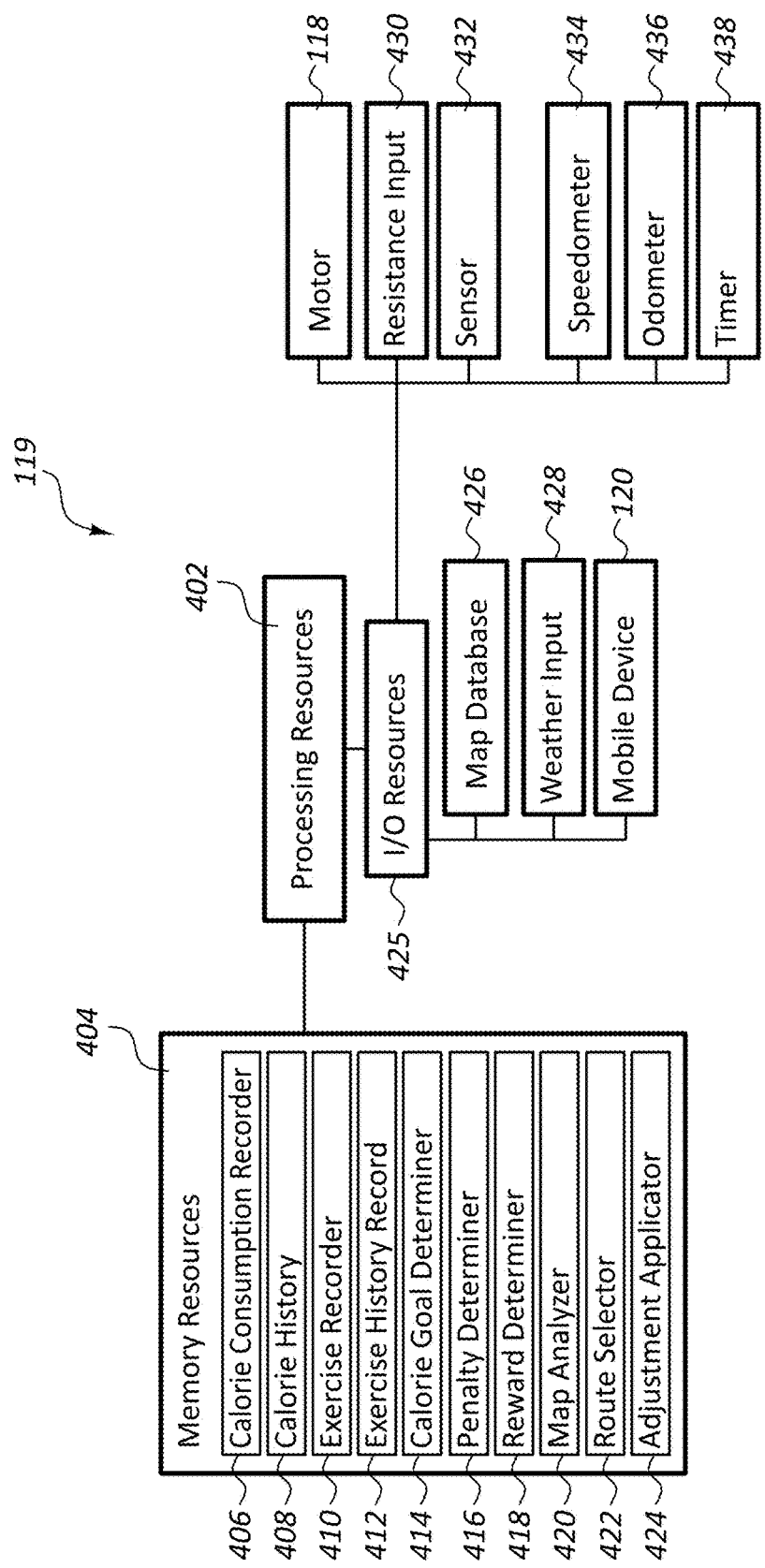
FIG. 4 illustrates a block diagram of an example of an adjustment system in accordance with the present disclosure.

FIG. 4 illustrates a perspective view of an example of an adjustment system 119 in accordance with the present disclosure. The adjustment system 119 may include a combination of hardware and programmed instructions for executing the functions of the adjustment system 119. In this example, the adjustment system 119 includes processing resources 402 that are in communication with memory resources 404. Processing resources 402 include at least one processor and other resources used to process the programmed instructions. The memory resources 404 represent generally any memory capable of storing data such as programmed instructions or data structures used by the adjustment system 119. The programmed instructions and data structures shown stored in the memory resources 404 include a calories consumption recorder 406, a calorie history 408, an exercise recorder 410, an exercise history record 412, a calorie goal determiner 414, a penalty determiner 416, a reward determiner 418, a map analyzer 420, a route selector 422 and an adjustment applicator 424.

The processing resources 402 may be in communication with I/O resources 425 that communicates with external devices. Such external devices may include a map database 426, a weather input 428, a mobile device 120, another external device, or combinations thereof. In some examples, the adjustment system 119 communicates with the remote device through a mobile device 120 which relays communications between the adjustment system 119 and the remote device. In other examples, the mobile device 120 has access to information about the user. In some cases, the remote device 120 collects information about the user throughout the day, such as tracking calories, exercise, activity level, sleep, other types of information or combination thereof.

The weather input 428 may include a link to a service that provides information about the weather. The information about the weather may be used to more accurately determine the number of calories that the user is burning. For example, if the wind is contrary to the user, the user may burn more calories than the human powered vehicle's instrumentation may otherwise indicate. On the other hand, if the user has a tail wind, the user may burn less calories than the human powered vehicle's instrumentation may otherwise indicate. Thus, the adjustment system 119 may use the weather information to more accurately determine the amount of calories that the user will likely burn on the route, and thereby more accurately apply the appropriate level of either a penalty or reward.

The remote device 120 may execute a program that can provide useful information to the adjustment system 119. An example of a program that may be compatible with the principles described herein includes the iFit program as described above. In some examples, the user information accessible through the remote device includes the user's age, gender, body composition, height, weight, health conditions, other types of information or combinations thereof.

The processing resources 402, memory resources 404 and remote devices may communicate over any appropriate network and/or protocol through the I/O resources 425. In some examples, the I/O resources 425 includes a transceiver for wired and/or wireless communications. For example, these devices may be capable of communicating using the ZigBee protocol, Z-Wave protocol, BlueTooth protocol, Wi-Fi protocol, Global System for Mobile Communications (GSM) standard, another standard or combinations thereof. In other examples, the user can directly input some information into the adjustment system 119 through a digital input/output mechanism, a mechanical input/output mechanism, another type of mechanism or combinations thereof.

The memory resources 404 include a computer readable storage medium that contains computer readable program code to cause tasks to be executed by the processing resources 402. The computer readable storage medium may be a tangible and/or non-transitory storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, magnetic based memory, other types of memory or combinations thereof.

The calorie consumption recorder 406 represents programmed instructions that, when executed, cause the processing resources 402 to record the amount of calories that the user has consumed. This information may be gathered from sensors or may be inputted by the user. The calorie history 408 represents a data structure that stores the calories consumed by the user. This information may be stored such that user's calorie history may be accessed to determine whether the user earns a reward or a penalty.

The exercise recorder 410 represents programmed instructions that, when executed, cause the processing resources 402 to record the exercises performed by the user and store them in the exercise history record 412. The information in the exercise history record 412 may also be accessible to determine the amount of calories burned by the user.

The calorie goal determiner 414 represents programmed instructions that, when executed, cause the processing resources 402 to determine the user's calorie goals. Such goals may be inputted by the user, a doctor, a trainer, a program or combinations thereof. In some cases, the calorie goal is calculated by the adjustment system 119 based on the user's weight loss goals or calculated based on other principles. The penalty determiner 416 represents programmed instructions that, when executed, cause the processing resources 402 to determine if the user has earned a penalty. If the user has earned a penalty, the penalty determiner 416 may determine the size of the penalty. The reward determiner 418 represents programmed instructions that, when executed, cause the processing resources 402 to determine if the user has earned a reward. If the user has earned a reward, the reward determiner 418 may determine the size of the reward.

The map analyzer 420 represents programmed instructions that, when executed, cause the processing resources 402 to analyze the map representing the area in which the user is located. The route selector 422 represents programmed instructions that, when executed, cause the processing resources 402 to select a route for the user to travel. The adjustment applicator 424 represents programmed instructions that, when executed, cause the processing resources 402 to apply either the reward or the penalty to the section of the route where the reward or penalty is predetermined to be applied.

The I/O resources 425 may also be in communication with the motor 118 to send communications from the adjustment applicator 424. Further, the I/O resources 425 may be in communication with devices attached to the human powered vehicle. For example, the I/O resources 425 may be in communication with a resistance input 430 of the resistance mechanism, a sensor 432, a speedometer 434, an odometer 436 and a timer 438.

Further, the memory resources 404 may be part of an installation package. In response to installing the installation package, the programmed instructions of the memory resources 404 may be downloaded from the installation package's source, such as a portable medium, a server, a remote network location, another location or combinations thereof. Portable memory media that are compatible with the principles described herein include DVDs, CDs, flash memory, portable disks, magnetic disks, optical disks, other forms of portable memory or combinations thereof. In other examples, the program instructions are already installed. Here, the memory resources 404 can include integrated memory such as a hard drive, a solid state hard drive or the like.

In some examples, the processing resources 402 and the memory resources 404 are located within the motor 118, the resistance mechanism, the human powered vehicle 100, a mobile device, an external device, another type of device or combinations thereof. The memory resources 404 may be part of any of these device's main memory, caches, registers, non-volatile memory or elsewhere in their memory hierarchy. Alternatively, the memory resources 404 may be in communication with the processing resources 402 over a network. Further, data structures, such as libraries or databases containing user and/or workout information, may be accessed from a remote location over a network connection while the programmed instructions are located locally. Thus, the adjustment system 119 may be implemented with the mobile device, a bicycle accessory, the human powered vehicle device, a phone, an electronic tablet, a wearable computing device, a head mounted device, a server, a collection of servers, a networked device, a watch or combinations thereof. Such an implementation may occur through input/output mechanisms, such as push buttons, touch screen buttons, voice commands, dials, levers, other types of input/output mechanisms or combinations thereof. Any appropriate type of wearable device may include, but are not limited to glasses, arm bands, leg bands, torso bands, head bands, chest straps, wrist watches, belts, earrings, nose rings, other types of rings, necklaces, garment integrated devices, other types of devices or combinations thereof.

The adjustment system 119 of FIG. 4 may be part of a general purpose computer. However, in alternative examples, the adjustment system 119 is part of an application specific integrated circuit.

While the examples above have been described with reference to human powered vehicles having both a resistance mechanism for implementing penalties and a motor for implementing rewards, in some examples the human powered vehicle includes just a mechanism for applying a penalty or just a mechanism for applying a reward. Further, while the examples above have been described with specific reference to rewards being applied based on a motor, any appropriate mechanism for applying the reward may be used in accordance with the principles described in the present disclosure. For example, the reward may be implemented with a spring mechanism, a hydraulic mechanism, a magnetic mechanism, compressed gas, a cam, a pneumatic mechanism, another type of mechanism or combinations thereof. Also, while the examples above have been described with specific reference to a bicycle, any appropriate type of human powered vehicle may be used. For example, the human powered vehicle may include a bicycle, a tricycle, a unicycle, human powered watercraft, a paddle boat, a velomobile, another human powered vehicles or combinations thereof. In some examples, the human powered vehicle is constructed to include the adjustment system 119 during manufacturing. In other examples, the human powered vehicle is retrofitted to include the adjustment system 119.

INDUSTRIAL APPLICABILITY

In general, the invention disclosed herein may provide the user with a human powered vehicle that can assist the user in obtaining health related goals. The human powered vehicle can incorporate an adjustment system that changes the level of difficulty for propelling the human powered vehicle forward. The adjustment system may also determine where along a route to be taken by the user to change the difficulty based on the user's goals. For example, if the user has a goal to lose one pound a week, the user may need to lose roughly 500 calories a day. If the user fails to have a net deficit of 500 calories, the user will fall behind on his goal. The present invention allows the human powered vehicle to increase the difficulty of propelling the human powered vehicle forward to assist the user in catching up with his or her calorie deficit goal. On the other hand, if the user is ahead of his or her goal because the user is having a calorie deficit that exceeds 500 calories a day, the invention allows the user to scale back the amount of energy that the user is dedicating to the workout. This allows the user to enjoy his or her experience of propelling the human powered vehicle without over doing it. By helping the user achieve his or her goals at a steady pace, the user may be able to accomplish more over a longer period of time without burning out.

Further, the present invention provides the user with motivation to stick to his or her health goal plan. If the user makes an unhealthy decision, the user gets feedback through the adjustment system and pays the price in terms of energy expenditure to get back on track. For example, if the user decides that eating junk food one afternoon will not negatively affect his or her goals, the adjustment system may adjust the level of difficulty of propelling the human powered vehicle, which can show the user the consequences of eating the junk food. As a result, the user may rethink eating junk food at a subsequent time while still trying to obtain the health goals. Thus, the present invention may help reinforce healthy decision making.

Further, the user may use the human powered vehicle to be more flexible in his or her pursuit of health goals. For example, the human powered vehicle may help the user give more on days that is convenient for the user to give more while allowing the user to give less on other days. Also, the user may want the ability to cheat on his or her health goals understanding that he has to make up what he or she loses from the cheating. The human powered vehicle helps the user track how much more he or she has to work to catch up. In some cases, the user may not have to pay attention to the amount of calories he or she is expending because the human powered vehicle will make the user exert the amount of energy that the user has to put in to reach his or her goals.

What is claimed is:

1. A human powered vehicle, comprising:
a frame;
a crank assembly disposed on the frame;
a wheel rotatably attached to the frame;
a rotation force adjustment assembly disposed on the frame in communication with the wheel;
a processor and memory; and
the memory comprising programmed instructions executable by the processor to:
determine a calorie goal of a user;
determine a user history;
adjust the force applied by the adjustment assembly based at least in part on the calorie goal; and
provide the user a reward when the user is ahead of the calorie goal, wherein the reward includes a selective assistance with a rotation of the wheel during a workout.

2. The human powered vehicle of claim 1, wherein the programmed instructions are further executable by the processor to determine a route to be taken by the user.

3. The human powered vehicle of claim 2, wherein the programmed instructions are further executable by the processor to determine where along the route to adjust the force applied by the adjustment assembly.

4. The human powered vehicle of claim 1, wherein the user history comprises a calorie history.

5. The human powered vehicle of claim 1, wherein the user history comprises an exercise history.

6. The human powered vehicle of claim 1, wherein the adjustment assembly comprises an assistance mechanism arranged to contribute to the rotation of the wheel.

7. The human powered vehicle of claim 6, wherein the assistance mechanism is arranged to contribute to the rotation of the wheel when the user earns the reward.

8. The human powered vehicle of claim 1, wherein the adjustment assembly comprises a resistance mechanism arranged to resist the rotation of the wheel.

9. The human powered vehicle of claim 8, wherein the resistance mechanism is arranged to resist the rotation of the wheel when the user receives a penalty by being behind in achieving the calorie goal.

10. The human powered vehicle of claim 1, wherein the adjustment assembly is in communication with a remote computing device.

11. The human powered vehicle of claim 1, further comprising a sensor that determines whether the adjustment assembly applies the force.

12. The human powered vehicle of claim 11, wherein the sensor is a thermal sensor arranged to determine when a temperature threshold of the adjustment assembly is reached.

13. A human powered vehicle, comprising:
a frame;
a crank assembly disposed on the frame;
a wheel rotatably attached to the frame;
a force rotation adjustment assembly disposed on the frame in communication with the wheel;
a processor and memory;
the memory comprising programmed instructions executable by the processor to:
determine a calorie goal of a user;
determine a user history; and
adjust the force applied by the adjustment assembly based at least in part on the calorie goal;
the adjustment assembly comprises an assistance mechanism arranged to contribute to the rotation of the wheel; and
the assistance mechanism is arranged to contribute to the rotation of the wheel when the user earns a reward by being ahead of the calorie goal.

14. The human powered vehicle of claim 13, wherein the programmed instructions are further executable by the processor to postpone assistance from the assistance mechanism to build up a larger reward.

15. The human powered vehicle of claim 13, wherein the programmed instructions are further executable by the processor to determine a route to be taken by the user.

16. The human powered vehicle of claim 15, wherein the programmed instructions are further executable by the processor to determine where along the route to adjust the force applied by the adjustment assembly.

17. The human powered vehicle of claim 13, wherein the user history comprises a calorie history.

18. The human powered vehicle of claim 13, wherein the user history comprises an exercise history.

19. The human powered vehicle of claim 13, wherein the adjustment assembly comprises a resistance mechanism arranged to resist the rotation of the wheel.

20. A human powered vehicle, comprising:
a frame;
a crank assembly disposed on the frame;
a wheel rotatably attached to the frame;
a rotation force adjustment assembly disposed on the frame in communication with the wheel;
a processor and memory;
the memory comprising programmed instructions executable by the processor to:
determine a calorie goal of a user;
determine a user history, the user history comprises a calorie history and an exercise history;
determine a route to be taken by the user;
adjust the force applied by the adjustment assembly based at least in part on the calorie goal; and
determine where along the route to adjust the force applied by the adjustment assembly;
the adjustment assembly comprises an assistance mechanism arranged to contribute to the rotation of the wheel and a resistance mechanism arranged to resist the rotation of the wheel;
the assistance mechanism is arranged to contribute to the rotation of the wheel when the user earns a reward by being ahead of the calorie goal;
the resistance mechanism is arranged to resist the rotation of the wheel when the user receives a penalty by being behind in achieving the calorie goal;
the adjustment assembly is in communication with a remote computing device;
a sensor that determines whether the assistance mechanism applies the force; and
the sensor is a thermal sensor arranged to determine when a temperature threshold of the assistance mechanism is reached.

* * * * *